(12) United States Patent
Cook et al.

(10) Patent No.: US 11,565,960 B2
(45) Date of Patent: Jan. 31, 2023

(54) APPARATUS AND METHOD FOR FORMING A GLASS ARTICLE

(71) Applicant: CORNING INCORPORATED, Corning, NY (US)

(72) Inventors: Mark Alan Cook, Painted Post, NY (US); Zagorka Dacic Gaeta, Ithaca, NY (US); Sung Hwan Lee, Xitun Dist. (TW); Daniel Arthur Nolet, Danville, KY (US); Guido Peters, Bath, NY (US)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 16/347,395

(22) PCT Filed: Nov. 8, 2017

(86) PCT No.: PCT/US2017/060556
§ 371 (c)(1),
(2) Date: May 3, 2019

(87) PCT Pub. No.: WO2018/089436
PCT Pub. Date: May 17, 2018

(65) Prior Publication Data
US 2020/0262731 A1   Aug. 20, 2020

Related U.S. Application Data

(60) Provisional application No. 62/419,115, filed on Nov. 8, 2016.

(51) Int. Cl.
*C03B 5/04* (2006.01)
*C03B 5/185* (2006.01)
*C03B 3/00* (2006.01)

(52) U.S. Cl.
CPC ............. *C03B 5/185* (2013.01); *C03B 3/005* (2013.01); *C03B 5/04* (2013.01)

(58) Field of Classification Search
CPC ................................ C03B 5/183; C03B 5/185
See application file for complete search history.

(56) References Cited

U.S. PATENT DOCUMENTS 2,277,679 A * 3/1942 Borel ................. C03B 5/03
                                                    373/36
2,387,880 A * 10/1945 Campbell ............ C03B 5/20
                                                    65/343

(Continued)

FOREIGN PATENT DOCUMENTS

CN    105776819 A    7/2016
GB      405012 A    1/1934

(Continued)

OTHER PUBLICATIONS

International Search Report and Written Opinion of the International Searching Authority; PCT/US2017/060556 dated Feb. 6, 2018; 15 Pages; European Patent Office.

(Continued)

*Primary Examiner* — Jodi C Franklin
(74) *Attorney, Agent, or Firm* — Kevin M. Able

(57) ABSTRACT

An electrically boosted refractory melting vessel including a back wall, a first side wall, a second side wall, a front wall and a bottom wall, the melting vessel comprising a longitudinal center line extending from the back wall to the front wall and an overall width orthogonal to the longitudinal center line extending between an inside surface of the first side wall and an inside surface of the second side wall. The melting vessel also includes a length L between the back wall and the front wall, and a width W between the first side wall and the second side wall orthogonal to the center line. A plurality of electrodes extend into an interior of the (Continued)

melting vessel through a bottom wall of the melting vessel, and L/W is in a range from about 2.0 to about 2.4.

17 Claims, 7 Drawing Sheets

(56) References Cited

U.S. PATENT DOCUMENTS

| | | | | |
|---|---|---|---|---|
| 2,832,958 | A * | 4/1958 | Penberthy | C03B 5/185 373/1 |
| 2,914,784 | A * | 12/1959 | Floyd | C03B 33/033 15/4 |
| 3,328,153 | A * | 6/1967 | Augsburger | H05B 3/0023 65/159 |
| 3,420,653 | A | 1/1969 | Boettner | |
| 3,583,861 | A * | 6/1971 | Preston | C03B 5/0275 65/129 |
| 3,592,370 | A * | 7/1971 | Boardman | C03B 33/10 225/2 |
| 3,741,742 | A * | 6/1973 | Jennings | C03B 5/245 65/480 |
| 3,806,621 | A * | 4/1974 | Machlan | H05B 3/0023 373/41 |
| 3,818,112 | A * | 6/1974 | Clishem | H05B 3/0023 373/40 |
| 3,836,689 | A * | 9/1974 | Holler | G05D 23/22 373/40 |
| 3,842,180 | A * | 10/1974 | Froberg | H05B 3/0023 373/40 |
| 3,885,945 | A * | 5/1975 | Rees | C03B 5/04 373/29 |
| 3,899,317 | A | 8/1975 | Heithoff | |
| 3,942,968 | A * | 3/1976 | Pieper | C03B 5/26 373/32 |
| 3,951,635 | A * | 4/1976 | Rough, Sr. | C03B 5/2255 65/347 |
| 3,961,126 | A * | 6/1976 | Maddux | H05B 3/0023 373/40 |
| 4,000,360 | A * | 12/1976 | Gell | C03B 5/027 373/41 |
| 4,029,489 | A * | 6/1977 | Froberg | C03B 5/235 373/29 |
| 4,029,887 | A * | 6/1977 | Spremulli | C03B 5/031 373/32 |
| 4,143,232 | A * | 3/1979 | Bansal | C03B 5/0275 373/41 |
| 4,246,433 | A * | 1/1981 | Seifried | H05B 3/0023 373/41 |
| 4,319,904 | A | 3/1982 | Gullett | |
| 4,413,346 | A * | 11/1983 | Palmquist | C03B 5/1672 373/41 |
| 4,528,013 | A * | 7/1985 | Dunn | C03B 7/094 65/499 |
| 4,531,218 | A * | 7/1985 | Williamson | C03B 5/027 373/41 |
| 4,543,117 | A | 9/1985 | Burget et al. | |
| 4,737,966 | A * | 4/1988 | Palmquist | C03B 5/225 373/41 |
| 4,741,753 | A * | 5/1988 | Sheinkop | C03B 5/027 65/29.21 |
| 4,804,208 | A * | 2/1989 | Dye | A61M 39/105 285/308 |
| 4,900,337 | A * | 2/1990 | Zortea | C03B 5/031 65/342 |
| 4,929,266 | A * | 5/1990 | Cozac | C03B 5/04 65/134.5 |
| 4,948,025 | A * | 8/1990 | Lisec | C03B 33/033 225/104 |
| 5,194,081 | A * | 3/1993 | Trevelyan | C03B 3/02 65/29.21 |
| 5,613,994 | A * | 3/1997 | Muniz | C03B 5/20 65/342 |
| 6,339,610 | B1 * | 1/2002 | Hoyer | C03B 5/225 373/32 |
| 7,017,372 | B2 | 3/2006 | Tomamoto et al. | |
| 7,454,925 | B2 | 11/2008 | DeAngelis et al. | |
| 7,553,390 | B2 * | 6/2009 | Yamabuchi | C03B 33/033 349/82 |
| 7,837,536 | B2 * | 11/2010 | Haneda | B24B 57/02 451/469 |
| 7,926,301 | B2 * | 4/2011 | Johnson | C03B 5/245 65/29.17 |
| 8,292,141 | B2 * | 10/2012 | Cox | B26F 3/002 225/104 |
| 8,756,817 | B2 * | 6/2014 | Cavallaro, III | C03B 33/0235 30/2 |
| 10,167,220 | B2 * | 1/2019 | Boughton | H05B 7/12 |
| 10,633,274 | B2 * | 4/2020 | De Angelis | C03B 5/02 |
| 11,319,234 | B2 * | 5/2022 | Cook | C03B 5/185 |
| 2005/0056127 | A1 * | 3/2005 | Yamabuchi | G02F 1/133351 83/13 |
| 2009/0025752 | A1 * | 1/2009 | Rui | B08B 1/008 65/168 |
| 2009/0044567 | A1 * | 2/2009 | Johnson | C03B 5/245 65/335 |
| 2010/0064732 | A1 | 3/2010 | Jeanvoine et al. | |
| 2010/0257899 | A1 | 10/2010 | Beaudoin et al. | |
| 2011/0130079 | A1 * | 6/2011 | Sgarabottolo | C03B 33/04 451/461 |
| 2012/0210842 | A1 * | 8/2012 | Brackley | B26D 7/088 83/886 |
| 2013/0219968 | A1 | 8/2013 | De Angelis et al. | |
| 2014/0230491 | A1 * | 8/2014 | Bookbinder | C03B 5/1675 65/29.17 |
| 2015/0299021 | A1 * | 10/2015 | Itoh | C03B 33/0235 83/887 |
| 2016/0068424 | A1 * | 3/2016 | Renz | C03B 33/107 225/2 |
| 2016/0096763 | A1 | 4/2016 | Aimone et al. | |
| 2016/0229732 | A1 * | 8/2016 | Yao | C03B 33/105 |
| 2020/0299167 | A1 * | 9/2020 | Zhang | C03B 5/03 |
| 2022/0225268 | A1 * | 7/2022 | Laine | H04W 4/33 |

FOREIGN PATENT DOCUMENTS

| | | | |
|---|---|---|---|
| GB | 1375760 A | 11/1974 | |
| JP | 09-124323 A | 5/1997 | |
| JP | 11-100214 A | 4/1999 | |
| JP | 2016-511739 A | 4/2016 | |
| JP | 2017119602 | * 7/2017 | C03B 5/03 |
| WO | 2016/054335 A1 | 4/2016 | |

OTHER PUBLICATIONS

Japanese Patent Application No. 2019-545896 Office Action dated Aug. 4, 2021, 10 pages (5 pages of English Translation and 5 pages of Original Document); Japanese Patent Office.

* cited by examiner

APPARATUS AND METHOD FOR FORMING A GLASS ARTICLE

CROSS-REFERENCE TO RELATED APPLICATIONS

This application claims the benefit of priority under 35 U.S.C. § 371 of International Application No. PCT/US2017/060556, filed on Nov. 8, 2017, which claims the benefit of priority to U.S. Provisional Application No. 62/419,115, filed Nov. 8, 2016, the contents of which are relied upon and incorporated herein by reference in their entirety as if fully set forth below.

BACKGROUND

Field

The present invention relates generally to apparatus and methods for forming a glass article, and in particular for melting raw materials to produce molten glass.

Technical Background

The large scale manufacture of glass articles, for example glass sheets used in the manufacture of display devices (e.g., television displays, computer displays, cell phone displays, laptop and tablet displays, etc.), begins with the melting of raw materials to produce a heated viscous material (hereinafter "molten glass" or "melt") that can be formed into the glass article in a downstream forming process. Raw materials, such as various metal oxides, modifiers, fluxes and fining agents are mixed and charged to the melting furnace in a continuous, semi-continuous or discrete process, where the raw materials are heated to a temperature at which the materials dissolve. The chemical composition of display-quality glass is such that melting temperatures are high, for example in a range from about 1525° C. to about 1575° C., requiring significant energy input. Accordingly, melting vessels for producing display glass may employ more thermally efficient electrically boosted Joule heating within the molten glass itself in addition to traditional combustion burners positioned in the upper portion of the melting vessel above the molten glass level (i.e., crown burners), or sometimes beneath the surface of the molten glass (i.e., submerged combustion burners).

In some industrial applications, for example in the manufacture of optical quality glass, relatively small melting vessels may be employed. Small melting vessels are less expensive to construct compared to acre-sized vessels that may be used in traditional float glass manufacturing operations, and can be better controlled.

To save costs, there is increasing pressure to produce more glass from the same suite of equipment. Even for smaller melting operations, the most practical method of increasing output is to increase the flow of molten glass from the melting vessel through the downstream manufacturing apparatus. The foregoing notwithstanding, the need to increase output has resulted in a push to increase the size of the melting vessel. However, there can be a limit to the size of some melting vessels, for example melting vessels that are at least partially heated by an electric current, at least for the reasons that the voltage required to electrically fire (e.g., establish an electric current) across the width of the melting vessel becomes increasingly dangerous to both manufacturing personnel and the electrical equipment itself. Additionally, high voltages run the risk of firing through the melting vessel refractory instead of the molten glass. Electric current bypassing the molten glass and passing directly through the refractory material of the melting vessel walls can cause excessive heating of the melting vessel walls and increase the likelihood of breakdown or dissolution of the wall material into the molten glass. This released wall material may in turn exceed the dissolution limits of a particular chemical species within the molten glass and increase the probability the chemical species does not fully dissolve and/or precipitates out of the molten glass, thereby forming a defect in the final glass article. For example, an increase in the amount of zirconia from high-zirconia refractory materials used in the melting vessel walls dissolved into the molten glass may lead to zirconia precipitating out of the molten glass and a subsequent formation of zirconia crystals in the melt as the molten glass cools in downstream portions of the apparatus. An inability to address some of these issues has been based, in part, on incompatibilities between various components of the melting apparatus and the molten glass, for example, between electrode materials and certain fining agents that may be included in the molten glass. In turn, compatible electrode materials can require physical embodiments that limit the size of the melting vessel to avoid exceeding the aforementioned voltage limits.

Changes in fining agents and electrode materials have allowed new melting vessel designs previously unachievable within established safety protocols, but outside historical experience. Consequently, changes to the melting vessel design to increase flow capacity, for example, changes to the width of the melting vessel, have resulted in unforeseen changes in the flow dynamics of the molten glass within the melting vessel, and subsequently an increase in defects in glass articles produced from the molten glass.

Accordingly, what is needed is a melting vessel design capable of supporting high flow with reduced defects.

SUMMARY

A method for producing an article is disclosed, the method comprising feeding with at least one screw feeder a raw material into a melting vessel containing molten glass, the melting vessel comprising a back wall, a front wall, a first side wall, a second side wall and a bottom wall, the melting vessel comprising a length L extending from an inside surface of the back wall to an inside surface of the front wall, a width W orthogonal to the length L extending from an inside surface of the first side wall to an inside surface of the second side wall, a longitudinal centerline extending along the length L and equidistant from both the first and second side walls, wherein L/W is in a range from about 2.0 to about 2.4. The method further comprises heating the molten glass with an electric current between a plurality of electrodes extending into an interior of the melting vessel, thereby producing a plurality of convection flows in the molten glass comprising a first convection flow at a first flow velocity parallel to the centerline in a direction toward the back wall, a second convection flow at a second flow velocity parallel to the centerline toward the front wall, a third convection flow at a third flow velocity in a transverse direction from the centerline toward the first side wall and a fourth convection flow at a fourth flow velocity in a transverse direction from the centerline toward the second side wall. An integrated ratio of the first flow velocity to the second flow velocity along the centerline at a position 5.1 cm below a surface of the molten glass is equal to or greater than 1.5.

In some embodiments, L·W is equal to or less than about 17 square meters, for example equal to or less than about 16 square meters, equal to or less than about 15 square meters, or equal to or less than about 14 square meters.

An inverse of an absolute value of the ratio of the third or fourth flow velocity to the second flow velocity at a position 0.05 L from the front wall and a depth 5.1 cm below a surface of the molten glass at a transverse position of the at least one screw feeder can be greater than 50%.

An inverse of an absolute value of the ratio of the third or fourth flow velocity to the first flow velocity at a position 0.05 L from the back wall and a depth 5.1 cm below a surface of the molten glass at a transverse position of the at least one screw feeder can be greater than 50%.

The method may further comprise, simultaneously with the heating the molten glass with the electric current, heating the molten glass with combustion burners.

In some embodiments, the energy input to the molten glass by the electric current is at least 20% of a total energy input into the molten glass by the electric current and the combustion burners.

In embodiments, the plurality of electrodes extend into an interior of the melting vessel through the bottom wall of the melting vessel.

The plurality of electrodes may comprise molybdenum.

In some embodiments, a variation in voltage-to-ground (VTG) evaluated at each electrode of the plurality of electrodes does not exceed zero±80 volts. For example, in embodiments, an absolute value of the VTG is equal to or less than 70 volts, for example equal to or less than about 65 volts.

The method may further comprise forming the molten glass into a ribbon, wherein a cord contrast value of the ribbon is equal to or less than 0.33%.

In another embodiment, an apparatus for producing a glass article is disclosed, comprising a melting vessel comprising a back wall, a front wall, a first side wall and a second side wall opposite the first side wall, the melting vessel further comprising a length L extending from an inside surface of the back wall to an inside surface of the front wall and a width W orthogonal to the length L extending from an inside surface of the first side wall to an inside surface of the second side wall, wherein L/W is in a range from about 2.0 to about 2.4. A plurality of electrodes extend into an interior of the melting vessel through a bottom wall of the melting vessel, each electrode comprising molybdenum.

L·W can be equal to or less than about 17 square meters, for example equal to or less than about 16 square meters, equal to or less than about 15 square meters, or equal to or less than about 14 square meters.

The apparatus may further comprise a plurality of combustion burners exposed to the interior of the melting vessel through one or both of the first and second side walls.

In still another embodiment, a method for producing an glass article is described, comprising feeding with at least one screw feeder a raw material into a melting vessel containing molten glass, the melting vessel comprising a back wall, a front wall, a first side wall, a second side wall and a bottom wall, the melting vessel comprising a length L extending from an inside surface of the back wall to an inside surface of the front wall, a width W orthogonal to the length L extending from an inside surface of the first side wall to an inside surface of the second side wall, a longitudinal centerline extending along the length L and equidistant from both the first and second side walls, wherein L·W is less than about 17 square meters and L/W is in a range from about 2.0 to about 2.4.

The method further comprises heating the molten glass with an electric current between a plurality of molybdenum-containing electrodes extending into an interior of the melting vessel, thereby producing a plurality of convection flows in the molten glass comprising a first convection flow at a first flow velocity parallel to the centerline in a direction toward the back wall, a second convection flow at a second flow velocity parallel to the centerline toward the front wall, a third convection flow at a third flow velocity in a transverse direction from the centerline toward the first side wall and a fourth convection flow at a fourth flow velocity in a transverse direction from the centerline toward the second side wall. An integrated ratio of the first flow velocity to the second flow velocity along the centerline at a position 5.1 cm below a surface of the molten glass is equal to or greater than 1.5.

The method may further comprise simultaneously with the heating the molten glass with the electric current, heating the molten glass with combustion burners.

In some embodiments, the energy input to the molten glass by the electric current is at least 20% of a total energy input into the molten glass by the electric current and the combustion burners.

In embodiments, an inverse of an absolute value of the ratio of the third or fourth flow velocity to the second flow velocity at a position 0.05 L from the front wall and a depth 5.1 cm below a surface of the molten glass at a transverse position of the at least one screw feeder is greater than 50%.

In embodiments, an inverse of an absolute value of the ratio of the third or fourth flow velocity to the first flow velocity at a position 0.05 L from the back wall and a depth 5.1 cm below a surface of the molten glass at a transverse position of the at least one screw feeder is greater than 50%.

Additional features and advantages of the embodiments disclosed herein will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments intended to provide an overview or framework for understanding the nature and character of the claimed invention. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
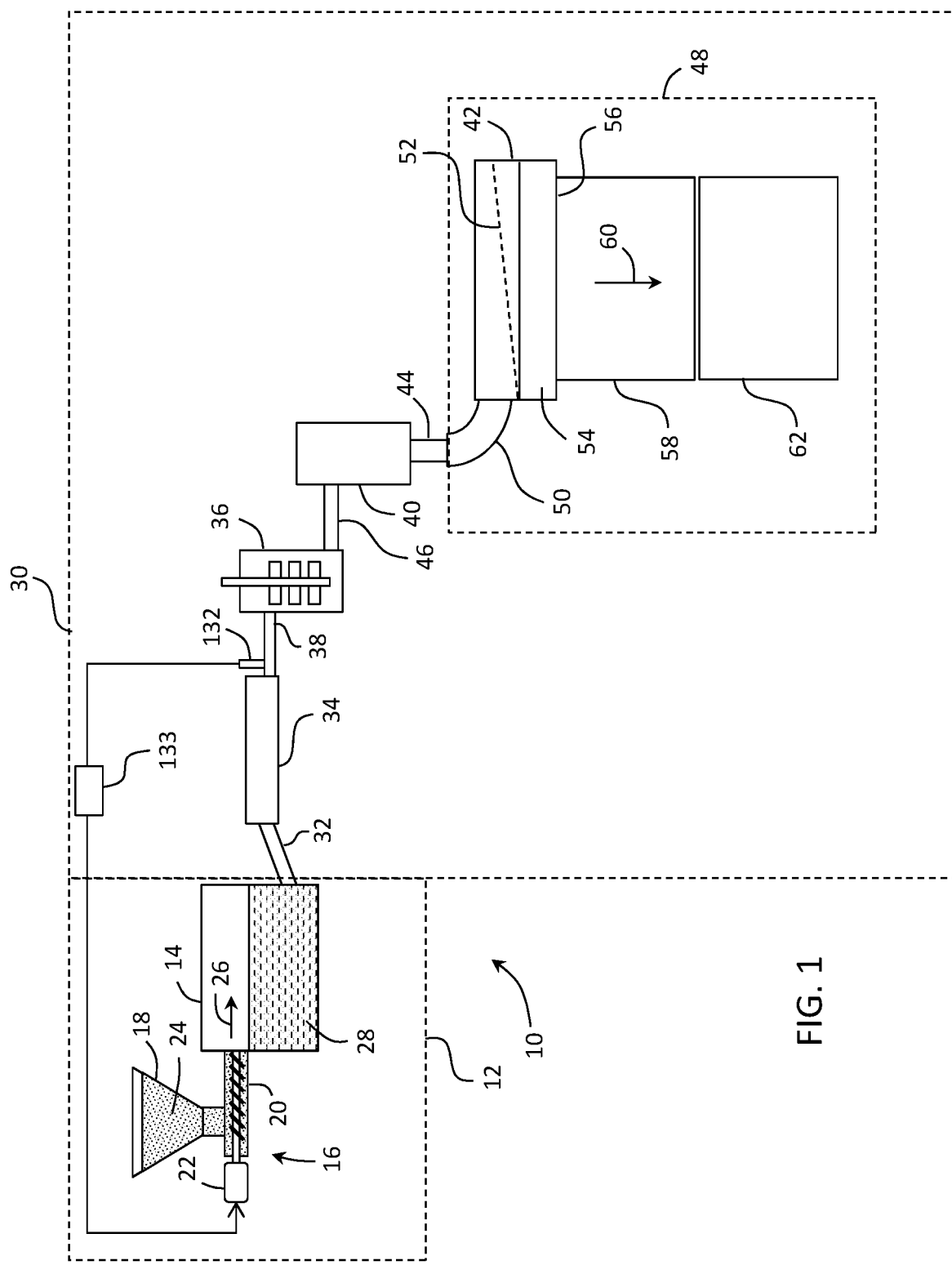
FIG. 1 is a schematic view of an exemplary glass making apparatus.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Historically, fining agents used to remove gas bubbles in a glass manufacturing fining process, for example in the manufacture of aluminoborosilicate glasses used to produce display glass, comprised arsenic oxide and/or antimony oxide, as these materials undergo redox reactions at relatively high temperatures compared to many alternative materials. This made arsenic oxide and/or antimony oxide ideal for high melting temperature raw materials. Additionally, arsenic and antimony produce significant oxygen during these redox reactions compared to other available fining agents. Unfortunately, chemical incompatibility between antimony and/or arsenic fining agents and molybdenum precluded the use of less expensive molybdenum electrodes in electrically fired, or electrically-boosted melting vessels, such as those often used in the manufacture of optical quality glass articles, for example glass substrates for use in the display industry, for example in the manufacture of cell phone displays, computer displays, television displays, and the like. This required the use of alternative electrode materials, such as those comprising tin (e.g., tin oxide). However, tin oxide is susceptible to corrosion due to the chemically aggressive nature of molten glass so that relatively frequent pushing of the electrodes into the molten glass to compensate for electrode corrosion and/or dissolution of the electrode(s) became necessary. It also became necessary to embed the tin oxide electrodes in the side walls of the melting furnace so that extension of the electrodes into the molten glass was minimized such that unnecessary exposure to the molten glass, and subsequent rapid dissolution of the electrodes therein, could be avoided. Thus, generally only the faces of the tin oxide electrodes were exposed to molten glass in wall-mounted positions.

More recently, environmental concerns lead to a switch from arsenic and antimony oxide fining agents to alternative fining agents, most notably tin oxide. Tin oxide is less effective as a fining agent than either one of arsenic and antimony oxides and comprises a lower solubility limit in hard, display-type glasses (e.g., alumino-borosilicate glasses), but is significantly less toxic that arsenic or antimony.

As product demands have increased the need for greater manufacturing output, the most practical alternative to meet this need has been to increase the size of the melting vessel by making the melting vessel larger rather than the building of additional manufacturing lines. However, width changes in the melting vessel were quickly overcome by constraints placed on the voltage applied to side wall-mounted electrodes. Because display-type glasses typically exhibit high resistivity, the voltage necessary to establish an electric current across a certain width of the melting vessel from electrode to electrode could not only become a danger to personnel working in and around the equipment, but could also reach a magnitude sufficient to establish an appreciable electric current in the refractory material of the melting vessel itself. That is, an electric current could be established between electrodes that extended through the melting vessel wall material, effectively bypassing the molten glass. Excessive heating of the melting vessel walls by electric current short-circuited through the melting vessel rather than through the molten glass can increase the dissolution rate of the melting vessel refractory material into the molten glass. Thus, there is a limit to the width of the melting vessel and the distance between the opposing side wall-mounted electrodes, thereby leaving only changes to the length of the melting vessel as a practical means to increase melt and flow capacity. Accordingly, most historical process optimization was focused on increasing the length of the melting vessel and longitudinal convection within the melt.

Convection in the melt is driven by glass composition and thermal gradients as delineated by the Rayleigh number Ra, a dimensionless scaling factor for convection that can be expressed in the form:

$$Ra = (g\beta \Delta T x^3)/(v_1 a_1) \qquad (1)$$

where g represents acceleration due to gravity, β represents the coefficient of thermal expansion, ΔT represents the thermal difference driving convection, x represents the characteristic length, v represents kinematic viscosity, and a represents thermal diffusivity. For this formulation, the strength of the convective force is determined by the glass coefficient of thermal expansion (CTE) as defined by β, which drives the density difference between hot and cold zones of the melting vessel and/or melt, the difference in temperature (ΔT) between the hot and cold zones, the viscosity of the glass in the melting vessel over this temperature range, and the length or distance between the hot and cold zones. As is evident, the position and temperature difference of the hot and cold zones is a large variable affecting most factors of the Rayleigh formulation.

The move away from arsenic and antimony oxide fining agents opened the door to alternative electrode materials, such as molybdenum, that are compatible with the tin oxide fining agent and less expensive than tin oxide electrodes. Additionally, molybdenum is more resistant to corrosion in the molten glass than tin oxide, and therefore molybdenum electrodes require less frequent pushes into the molten glass and consequently exhibit longer life. Accordingly, molybdenum electrodes can be extended directly into the molten glass as rods, such as from the bottom walls (and/or the side walls) of the melting vessel, thereby overcoming the constraint imposed by prior tin oxide electrodes on the width of the melting vessel. To wit, melting vessel capacity (e.g., flow rate from the melting vessel) can be increased by increasing the width of the melting vessel beyond previous constraints, as well as by increasing the length. Nevertheless, when melting vessel size increases were attempted, particularly in a width direction, using only historical precedence to guide the melting vessel design, the resultant melting vessels were unable to exceed certain flow rates without becoming unstable.

Those skilled in the art of melting raw materials to produce molten glass will appreciate that convection currents developed within the molten glass serve at least several objectives, e.g., to distribute heat energy through the mass of molten glass and to promote physical mixing of the molten glass. The convection currents in an electrically boosted melting vessel are developed from the heat input into the melt from the crown oxy-fuel burners and from electric current passing through the surrounding melt between the electrodes.

While the use of molybdenum electrodes opened up constraints on melting vessel width, it was discovered that changes to the size of the melting vessel, and more particularly to the aspect ratio of the melting vessel (i.e., length-to-width ratio) also resulted in undesirable changes to certain performance characteristics of the process, several of which include thermal variability in the melt, voltage variability, and inhomogeneity (cord) performance. While the first of these characteristics relates directly to the process itself, the last is an effect that may manifest directly in the final product. If a small region of inhomogeneity is able to survive the mixing action of the process, this material inhomogeneity (e.g., viscosity difference) can find its way into a drawn glass ribbon as a repeating pattern of nanometer-scale thickness deviations described as "cord". The human eye is inherently sensitive to these types of diffraction or lensing patterns, and its presence is highly undesirable in products destined for human observation, such as displays. Accordingly, through experimentation and modeling, a relationship between melting vessel design and performance was discovered that allowed size scaling of a melting vessel design to meet high flow demands.

Shown in FIG. 1 is an exemplary glass manufacturing apparatus 10. In some embodiments, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting furnace 14 may be an electrically boosted melting vessel, wherein energy is added to the raw material through both combustion burners and by direct heating, wherein an electric current is passed through the raw material, thereby adding energy via Joule heating of the raw material. As used herein, a melting vessel will be considered an electrically boosted melting vessel when, during the melting operation, the amount of energy imparted to the raw material and/or melt via direct electrical resistance heating (Joule heating) is equal to or greater than about 20% but less than 100%.

In further embodiments, glass melting furnace 12 may include thermal management devices (e.g., insulation components) that reduce heat loss from the melting vessel. In still further embodiments, glass melting furnace 12 may include electronic devices and/or electromechanical devices that facilitate melting of the raw material into a glass melt. Still further, glass melting furnace 12 may include support structures (e.g., support chassis, support member, etc.) or other components.

Glass melting vessel 14 is typically formed from a refractory material, such as a refractory ceramic material, for example a refractory ceramic material comprising alumina or zirconia, although other refractory materials, such as yttrium, may be used either alternatively or in addition. In some examples, glass melting vessel 14 may be constructed from refractory ceramic bricks.

In some embodiments, melting furnace 12 may be incorporated as a component of a glass manufacturing apparatus configured to fabricate a glass article, for example a glass ribbon of an indeterminate length, although in further embodiments, the glass manufacturing apparatus may be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be incorporated as a component of a glass manufacturing apparatus comprising a slot draw apparatus, a float bath apparatus, a down draw apparatus (e.g., a fusion down draw apparatus), an up draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down draw glass manufacturing apparatus 10 for fusion drawing a glass ribbon for subsequent processing into individual glass sheets or rolling the glass ribbon onto a spool.

Glass manufacturing apparatus 10 (e.g., fusion down draw apparatus 10) can optionally include an upstream glass manufacturing apparatus 16 positioned upstream relative to glass melting vessel 14. In some examples, a portion of, or the entire upstream glass manufacturing apparatus 16, may be incorporated as part of the glass melting furnace 12.

As shown in the embodiment illustrated in FIG. 1, the upstream glass manufacturing apparatus 16 can include a raw material storage bin 18, a raw material delivery device 20 and a motor 22 connected to the raw material delivery device. Storage bin 18 may be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 such that raw material delivery device 20 delivers a predetermined amount of raw material 24 from the storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as comprising various "sands". Raw material may also include scrap glass (i.e. cullet) from previous melting and/or forming operations. Combustion burners are typically used to begin the melting process. In an electrically boosted melting process, once the electrical resistance of the raw material is sufficiently reduced (e.g., when the raw materials begin liquifying), electric boost is begun by developing an electric potential between electrodes positioned in contact with the raw materials, thereby establishing an electric current through the raw material, the raw material typically entering, or in, a molten state at this time.

Glass manufacturing apparatus 10 can also optionally include a downstream glass manufacturing apparatus 30 positioned downstream of glass melting furnace 12 relative to a flow direction of the molten glass 28. In some examples, a portion of downstream glass manufacturing apparatus 30 may be incorporated as a part of glass melting furnace 12. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals can include molybdenum, rhenium, tantalum, titanium, tungsten and alloys thereof.

Downstream glass manufacturing apparatus 30 can include a first conditioning (i.e. processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated in a secondary vessel to continue the melting process, or cooled to a temperature lower than the temperature of the molten glass in the primary melting vessel before entering the fining vessel.

Within fining vessel 34, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although as noted previously, the use of arsenic and antimony may be discouraged for environmental reasons in some applications. Fining vessel 34 is heated to a temperature greater than the melting vessel temperature, thereby heating the fining agent. Oxygen bubbles produced by the temperature-induced chemical reduction of one or more fining agents included in the melt rise through the molten glass within the fining vessel, wherein gases in the molten glass produced in the melting furnace can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the molten glass.

The downstream glass manufacturing apparatus 30 can further include another conditioning vessel, such as a mixing apparatus 36 for mixing the molten glass that flows downstream from fining vessel 34. Mixing apparatus 36 can be used to provide a homogenous glass melt composition, thereby reducing chemical or thermal inhomogeneities that may otherwise exist within the fined molten glass exiting the fining vessel. As shown, fining vessel 34 may be coupled to mixing apparatus 36 by way of a second connecting conduit 38. In some embodiments, molten glass 28 may be gravity fed from the fining vessel 34 to mixing apparatus 36 by way of second connecting conduit 38. For instance, gravity may drive molten glass 28 through an interior pathway of second connecting conduit 38 from fining vessel 34 to mixing apparatus 36. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another. In some embodiments, one or more of the vessels and/or conduits may include static mixing vanes positioned therein to promote mixing and subsequent homogenization of the molten material.

Downstream glass manufacturing apparatus 30 can further include another conditioning vessel such as delivery vessel 40 that may be located downstream from mixing apparatus 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 by way of exit conduit 44. As shown, mixing apparatus 36 may be coupled to delivery vessel 40 by way of third connecting conduit 46. In some examples, molten glass 28 may be gravity fed from mixing apparatus 36 to delivery vessel 40 by way of third connecting conduit 46. For instance, gravity may drive molten glass 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down draw glass making apparatus can comprise a trough 52 positioned in an upper surface of the forming body and converging forming surfaces 54 that converge in a draw direction along a bottom edge (root) 56 of the forming body. Molten glass delivered to the forming body trough via delivery vessel 40, exit conduit 44 and inlet conduit 50 overflows the walls of the trough and descends along the converging forming surfaces 54 as separate flows of molten glass. The separate flows of molten glass join below and along the root to produce a single ribbon of molten glass 58 that is drawn in a draw direction 60 from root 56 by applying tension to the glass ribbon, such as by gravity, edge rolls and pulling rolls (not shown), to control the dimensions of the glass ribbon as the molten glass cools and a viscosity of the material increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, while in further embodiments, the glass ribbon may be wound onto spools and stored for further processing.

Figure 2:
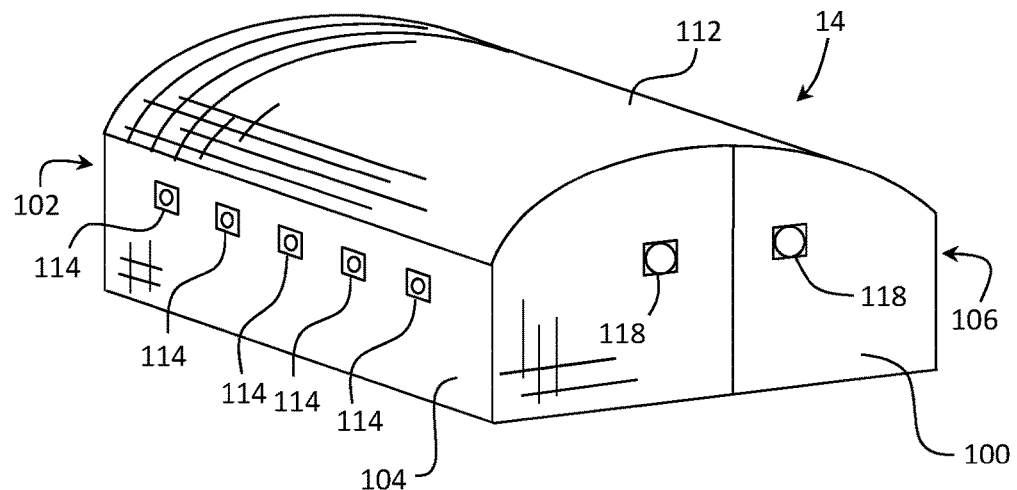
FIG. 2 is a perspective view of an exemplary melting vessel for producing molten glass.
Figure 3:
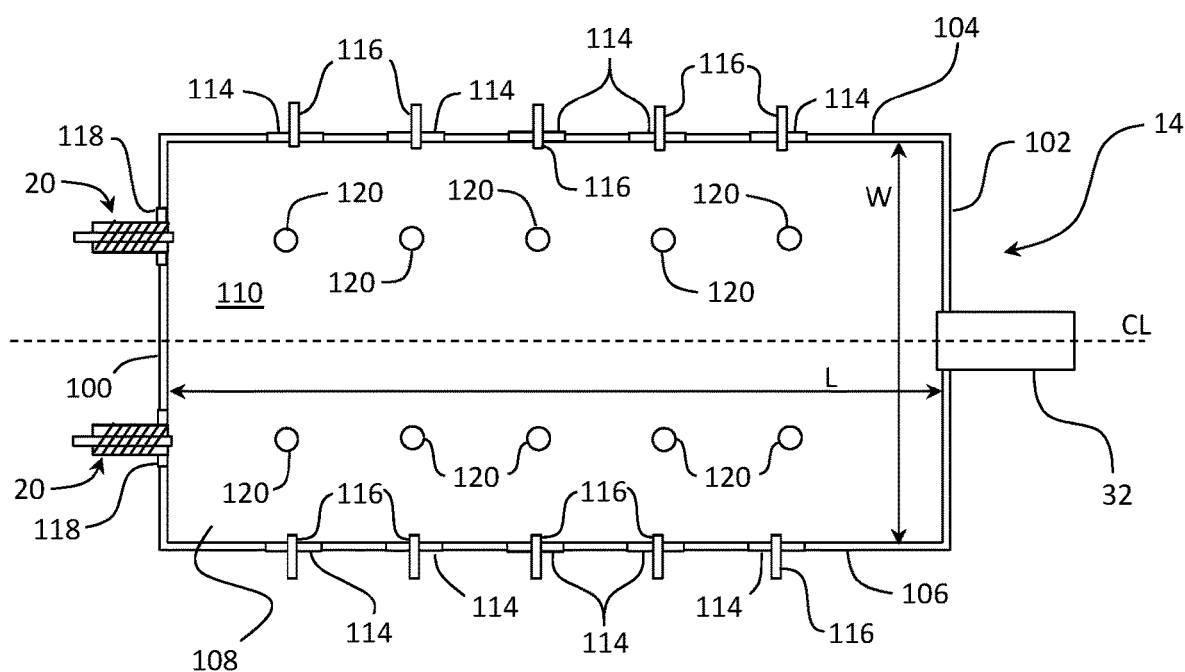
FIG. 3 is a longitudinal plan view of the melting vessel of FIG. 2.

Referring now to FIGS. 2 and 3, an exemplary melting vessel 14 is shown comprising back wall 100, front wall 102, first side wall 104, second side wall 106 and bottom wall 108 that together form basin 110, the walls arranged to hold molten glass 28 within basin 110 during the melting process. Melting vessel 14 is typically rectangular in shape, wherein second side wall 106 is parallel to first side wall 104, and back wall 100 is parallel with front wall 102. A top wall 112, typically, although not necessarily arched, extends over basin 110, and is usually referred to as the crown. Melting vessel 14 may further comprise a plurality of burner ports 114 positioned in an upper portion of first side wall 104 and second side wall 106, burner ports 114 including a plurality of respective combustion burners 116 positioned therein such that flames produced by the combustion burners extend over the raw materials and/or molten glass within the melting vessel, although in further embodiments, submerged combustion may be provided.

Melting vessel 14 further includes at least one feed port 118 opening through back wall 100 and coupled to raw material delivery device 20 such that raw material 24 can be delivered to basin 110 for processing into molten glass. In further embodiments, back wall 100 may include multiple feed ports 118 and multiple raw material delivery devices 20 that feed raw material into basin 110, for example two feed ports 118 and two raw material delivery devices 20, although more than two feed ports and more than two raw material delivery devices may be provided. In some embodiments, each raw material delivery device 20 may feed the same raw material to basin 110, although in further embodiments, different raw material delivery devices may feed different raw materials to basin 110. For example, in some embodiments, a first raw material delivery device may feed a first raw material to basin 110, while a second raw material delivery device may feed to basin 110 a second raw material different from the first raw material. Additionally, melting vessel 14 may also include a plurality of electrodes 120 extending into basin 110 through bottom wall 108, wherein the plurality of electrodes are in electrical communication with an electrical power source. However, in further embodiments, either alternatively or in addition, a plurality of electrodes 120 may extend into basin 110 through first side wall 104 and/or second side wall 106, while in still further embodiments, a plurality of electrodes may be positioned in both the side walls and the bottom wall. In some embodiments, the heat energy added to the molten material in basin 110 by electrodes 116 compared to the total heat energy added to the molten material via both burners 116 and electrodes 116 may range from about 20% to about 80%, such as equal to or greater than 30%, equal to or greater than 40%, equal to or greater than 50%, equal to or greater than 60%, or equal to or greater than 70%. For example, the ratio of heat energy added to the molten material in basin 110 via electrodes 120 compared to burners 116 may be 20%:80%, 30%:70%, 40%:60%, 50%:50%, 60%:40%, 70%:30% or even 80%:20%, including all ranges and subranges therebetween.

Thermocouples (not shown) may be embedded in any one or more of the various walls of the melting vessel. For example, thermocouples embedded in the bottom wall can provide bottom temperatures of the melt, such as longitudinally along the centerline of the melting vessel, while thermocouples embedded in the side walls can provide side temperatures of the melt. Thermocouples positioned in the top wall can provide crown temperatures.

As previously noted, melting vessel 14 is generally rectangular in shape and comprises a length L extending longitudinally from an inside surface of back wall 100 to an inside surface of front wall 102, and a width W extending orthogonal to length L, i.e., in a transverse direction from the inside surface of first side wall 104 to the inside surface of the opposing second side wall 106. A longitudinal centerline CL extends along the length of the melting vessel and bisects the melting vessel. An aspect ratio L/W of melting vessel 14 may, in some embodiments, be equal to or less than 2.5, but greater than 1.9, for example in a range from about 2.0 to about 2.5, from about 2.1 to about 2.5, in a range from about 2.2 to about 2.5. In certain embodiments, the aspect ratio L/W may be in a range from about 2.3 to about 2.5, for example 2.4. An area L·W of the interior of the melting vessel, which relates to the surface area of the molten glass within the interior of the melting vessel, is typically equal to or less than about 17 square meters, for example equal to or less than about 16 square meters, equal to or less than about 15 square meters, or even equal to or less than about 14 square meters.

In operation, the one or more raw material delivery devices 20 deliver raw material 24 to melting vessel 14 in response to a signal received from one or more level probes 132 positioned downstream of melting vessel 14 that sense a level of molten glass within manufacturing apparatus 10. For example, a level probe 132 may be positioned within or downstream of fining vessel 34. In some embodiments, level probe 132 may be positioned within conduit 38 as illustrated by FIG. 1. Each raw material delivery device 20 may be electrically coupled with a control device 133 configured to control the feeding of raw material into the melting vessel, for example in response to a signal from level probe 132. As raw material 24 enters basin 110, the raw material typically accumulates in a pile ("batch pile") beneath the respective feed port and spreads forward toward front wall 102, joining with a foamy layer of scum 134 (see FIG. 6) that floats on the surface of the molten glass. More typically, however, the raw material travels in a direction toward the front wall via "streams" that radiate from the batch pile. Such streams are often referred to as "batch snakes", in reference to their sometimes meandering route.

The scum layer comprises melting byproducts and undissolved raw material and extends from back wall 100 in a direction toward front wall 102, is generally rich in silica, is combined with gases released during melting, and is generally difficult to dissolve into the molten glass. Accordingly, scum layer 134 may approach front wall 102, and in some embodiments may extend across the entire surface of the melt.

As raw material 24 spreads forward from the batch pile(s), radiant and convective heat transfer from burners 116 help heat and melt the raw material. Similarly, an electric voltage may be applied to electrodes 120, establishing a current between groups of electrodes, for example pairs of electrodes, the current heating the molten glass from within via the resistance of the melt. Accordingly, conductive heat from the melt itself may further dissolve the raw material. It should be noted that not all the raw material introduced by batch delivery device 20 may completely dissolve within the melting vessel. For example, the weight of the raw material may drive a portion of the raw material through the scum layer and into the melt soon after entry into the melting vessel. Heavier individual raw material constituents may also descend through the scum layer early and circulate through the molten glass. However, as the raw material reaches forward and eventually descends through the scum layer and dissolves into the melt, grains of raw material may be retained within the scum layer sufficiently long for the grains to reach the front wall. If these grains eventually join the molten glass below the scum layer near the front wall, there may be insufficient time for the grains of raw material to fully dissolve within the melt, whereupon the incompletely-dissolved grains may become entrained into the flow of molten glass exiting the melting vessel and enter downstream glass making apparatus 30. Thus, the scum layer can be a source of contaminants for the finished glass article by providing an avenue by which grains of raw material effectively bypass the melting process.

Figure 4:
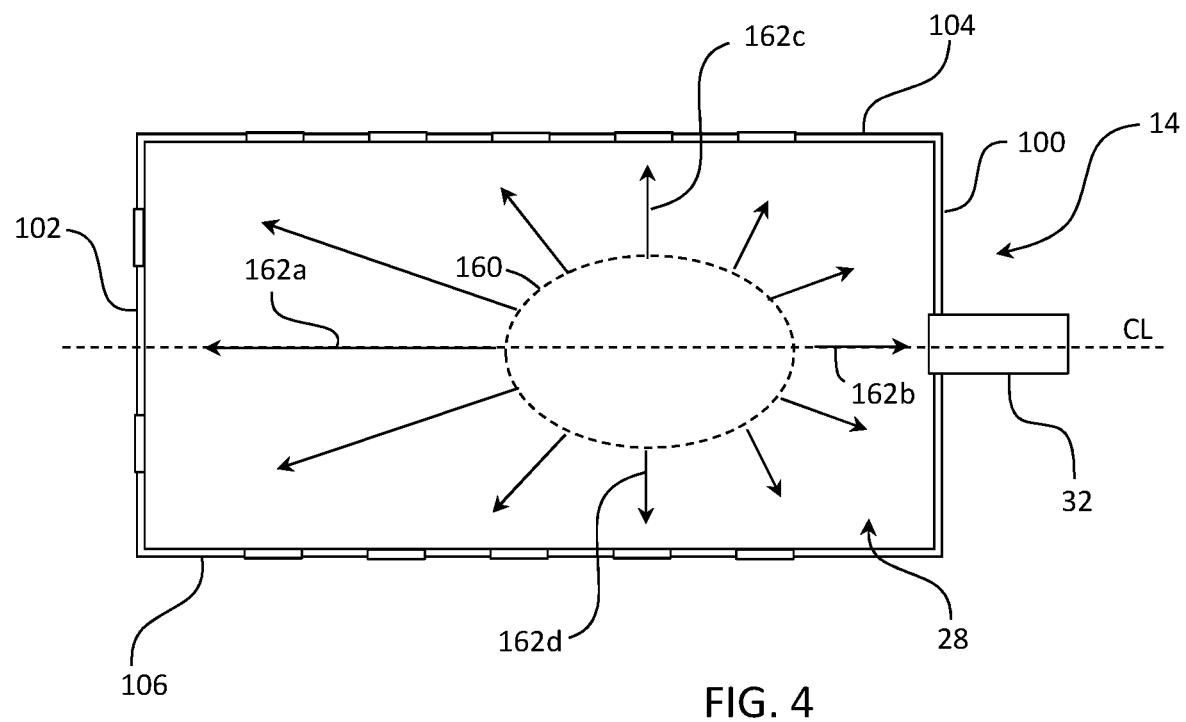
FIG. 4 is another longitudinal plan view of the melting vessel of FIG. 2, showing molten glass flow within the melting vessel.
Figure 5:
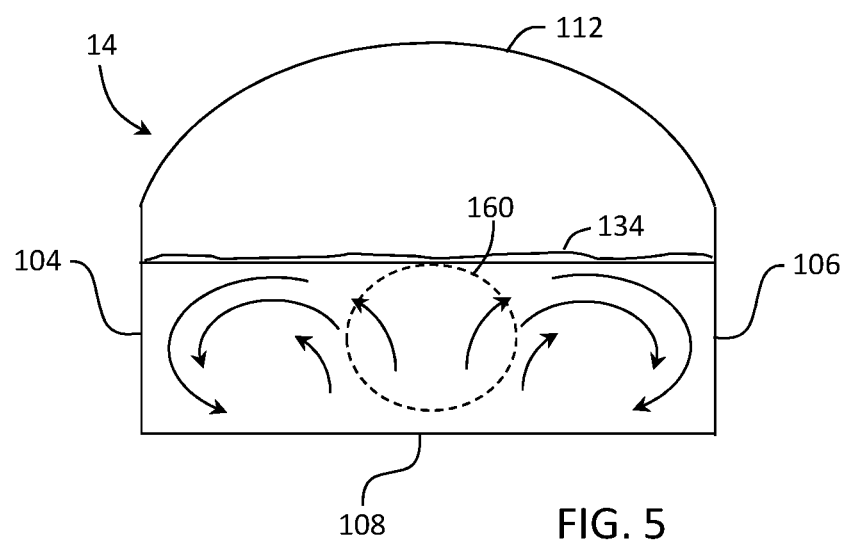
FIG. 5 is a transverse cross sectional view of the melting vessel of FIG. 2.
Figure 6:
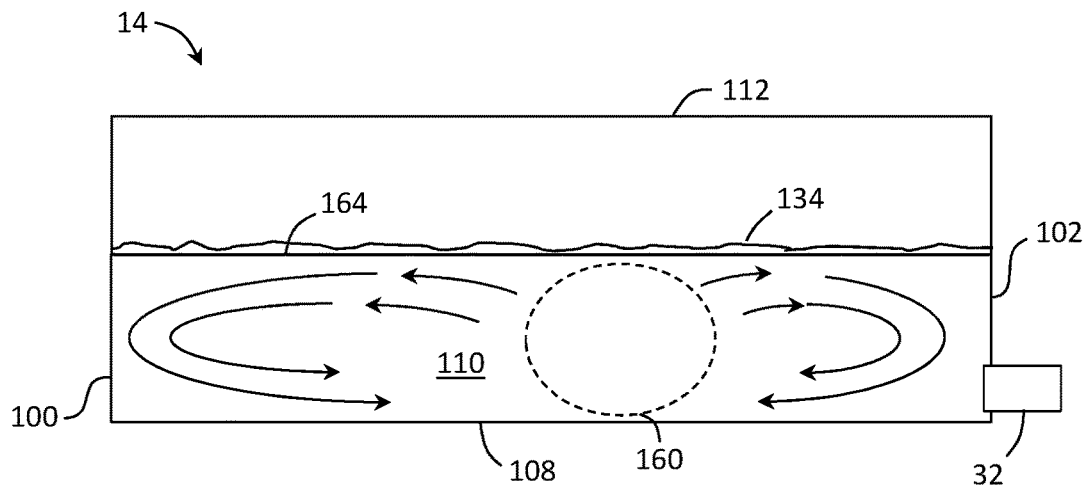
FIG. 6 is a longitudinal cross sectional view of the melting vessel of FIG. 2.

Referring now to FIGS. 4-6, heat energy applied to the molten glass through combustion burners and/or electric current between various electrodes can be controlled to produce a hot spot 160 in the body of the melt 28 such that the temperature differential between the hot spot and the cooler back, front and side walls of the melting vessel establishes convective flow within the melt. For example, FIG. 4, which is a top view of melting vessel 14 shown without top wall 112, illustrates a pattern of flow vectors as arrows radiating outward from hot spot 160, which represents the hottest region of the melt within the melting vessel, wherein the flow vectors describe the convective flow of molten glass. It should be noted that while flow vectors 162a and 162b indicate molten glass flow from hot spot 160 in a longitudinal direction toward back wall 100 and molten glass flow in a direction from hotspot 160 in a longitudinal direction toward front wall 102, respectively, each intermediate, generally rearward, flow vector comprises a rearward (longitudinal) flow component and each generally forward flow vector comprises a forward (longitudinal) flow component. Similarly, two opposite flows occur transversely, each transverse flow extending from hot spot 160 toward an adjacent side wall: transverse flow 162c moving in a direction from centerline CL toward first side wall 104 and transverse flow 162d moving in a direction from centerline CL toward second side wall 106. Each intermediate flow vector, generally in a width direction, comprises a transverse flow component. As used herein and to simplify description, unless otherwise stated, a transverse direction refers to a direction generally orthogonal to longitudinal axis (centerline) CL while a longitudinal flow refers to a direction parallel with centerline CL. Molten glass within hot spot 160 wells up from the bottom of basin 110 and spreads outward near the surface 164 of the melt toward the adjacent walls of the melting vessel. On the other hand, FIG. 5 is a transverse cross sectional view of melting vessel 14 illustrating transverse convective flow of molten glass that rises within the hot spot, crosses respective portions of the melt near the surface of the melt, then descends toward the bottom of basin 110 at the side walls and flows across the bottom of the melting vessel toward hot spot 160. Thus, as illustrated, two counter-rotating transverse convective currents (e.g., "cells") are established. Similarly, FIG. 6 is a longitudinal cross sectional view of melting vessel 14 illustrating longitudinal convective flow of molten glass that rises within the hot spot, crosses respective portions of the melt near the surface of the melt, then descends toward the bottom of basin 110 at the front and back walls and flows across the bottom of the melting vessel toward hot spot 160. Thus, as illustrated, two counter-rotating longitudinal convective currents (e.g., "cells") are established.

To better understand the available design options, process assumptions were included in a mathematical model to assess the relative strengths (flow velocities) of the transverse and longitudinal convection flows. It should be understood that melting is largely a surface phenomenon, and that evaluation of convection flow data is typically performed at or near the surface of the melt.

Figure 7:
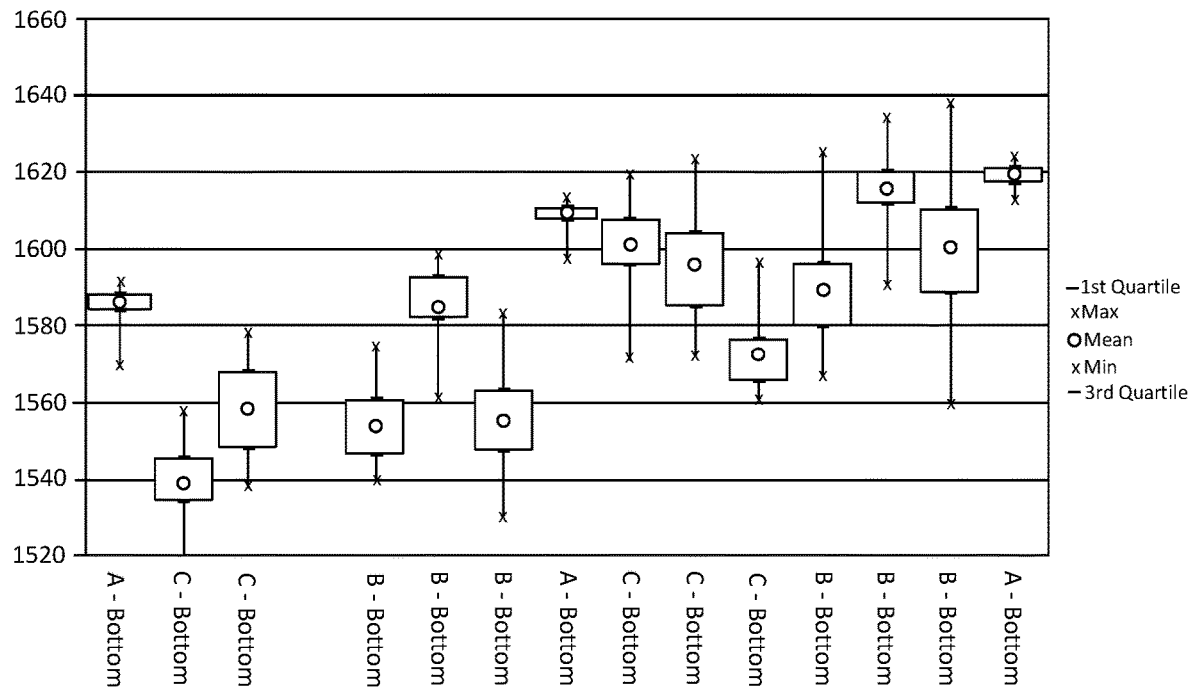
FIG. 7 is a box plot of three different melting vessel designs showing

FIG. 7 is a box plot illustrating melt temperature at the bottom of the melting vessel for three different melting vessel designs. In each case, the bottom temperature for three different positions was obtained from thermocouples positioned in the bottom wall along the centerline of an actual melting vessel. Melting vessel design A comprised molybdenum electrodes positioned within the bottom wall of the melting vessel and extending upward into the glass melt, wherein an aspect ratio of the melting vessel in design A was 2.4. Melting vessel design B comprised molybdenum electrodes positioned within the bottom wall of the melting vessel and extending upward into the glass melt, wherein an aspect ratio of the melting vessel was 1.9. Melting vessel design C comprised tin oxide electrodes positioned within and exposed to the melt at the side walls of the melting vessel, wherein an aspect ratio of the melting vessel was 2.4. The data show significant improvement in the range of bottom temperatures for melting vessel design A relative to designs B and C. More specifically, the data show very little spread in the temperature data between the $1^{st}$ and 2nd quartiles, as well as reduced spread between minimum and maximum bottom temperatures, for design A compared to designs B and C.

Figure 8A:
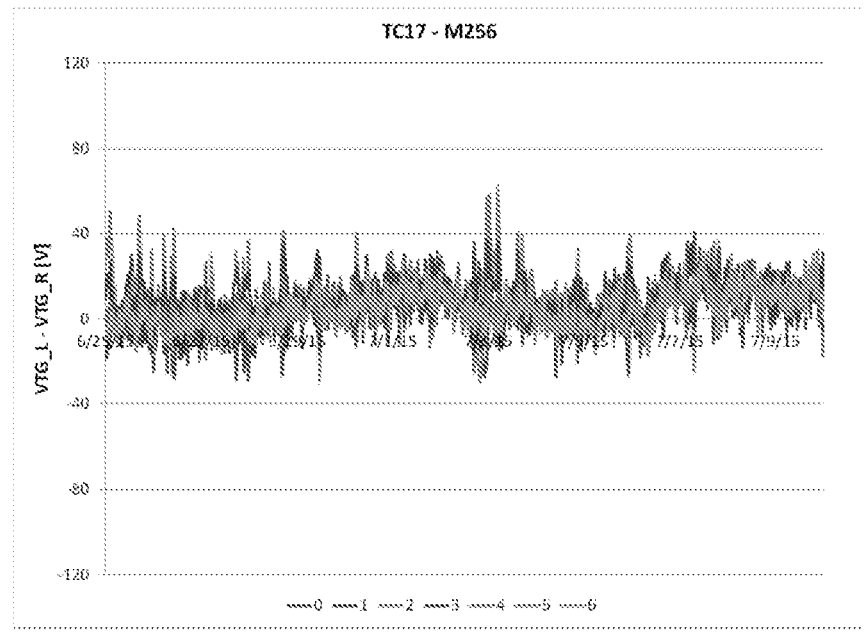
FIG. 8A is a graph of electrode voltage-to-ground for a melting vessel design A comprising bottom wall mounted electrodes and a length-to-width aspect ratio of 2.0.
Figure 8B:
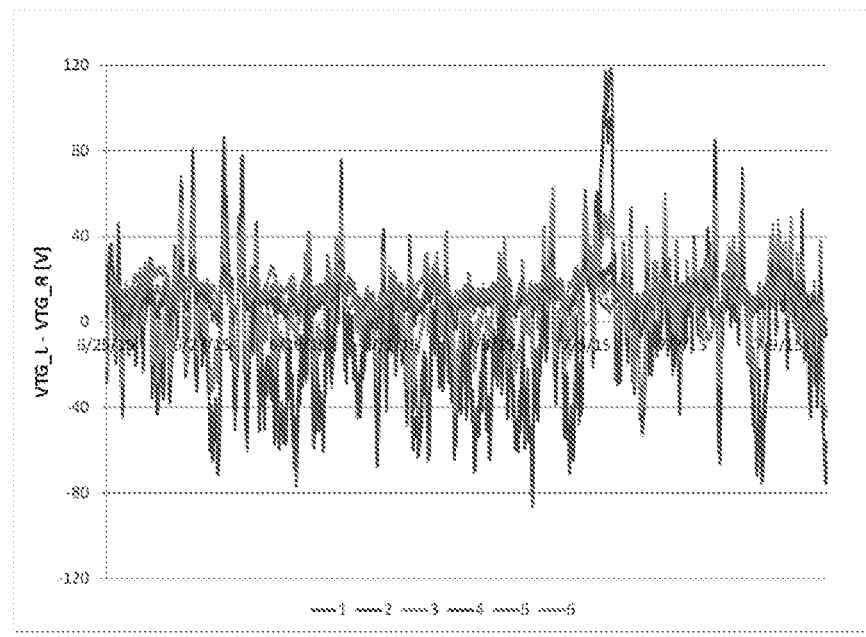
FIG. 8B is a graph of electrode voltage-to-ground for a melting vessel design B comprising bottom wall mounted electrodes and a length-to-width aspect ratio of 1.9.
Figure 8C:
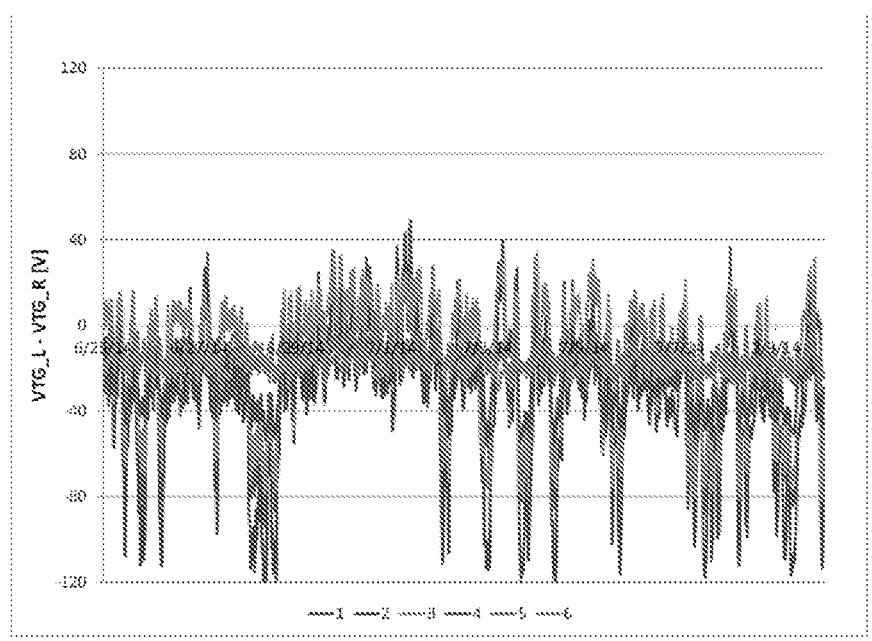
FIG. 8C is a graph of electrode voltage-to-ground for a melting vessel design C comprising side wall mounted electrodes and a length-to-width aspect ratio of 2.4.

FIGS. 8A, 8B and 8C are graphs of voltage-to-ground (VTG) for the same three melting vessels designs A, B and C, respectively, as in the previous example and obtained over a period of approximately 2 weeks. That is, the data illustrate the difference between the left and right side VTG measured at each electrode position. Ideally, VTG (from left to right of the plots) would be zero and with very little or no variation. In practical applications, the movement of raw material on the melt surface affects the temperatures of the process and the electrical fields in the glass, resulting in a variation in VTG. The VTG variation is representative of the relative stability of the thermal and electrical fields inside the melt. The individual data within the graph is of less importance (and difficult to observe in the graphs), than the spread of the data. It is readily apparent that design A, with bottom mounted molybdenum electrodes and an aspect ratio within a range of about 2.0 to about 2.5 (i.e., 2.4 in this specific instance) is more stable (exhibits significantly less variation in VTG) than designs B and C, both of which show large variability in VTG evidenced by large shifts over short periods of time. These shifts relate to unstable temperatures and performance variation in the melting process. Indeed, FIG. 8A shows that the absolute value of the maximum voltage variation is well under 80 volts (i.e., 0±80 volts), such as equal to or less than about 70 volts (i.e., 0±70 volts), for example equal to or less than about 65 volts (i.e., 0±65 volts), and with few exceptions, within ±40 volts. The designs of melting vessel B (FIG. 8B) and C (FIG. 8C) show significantly greater variability in voltage to ground, in some cases as much as 0±120 volts.

Figure 9:
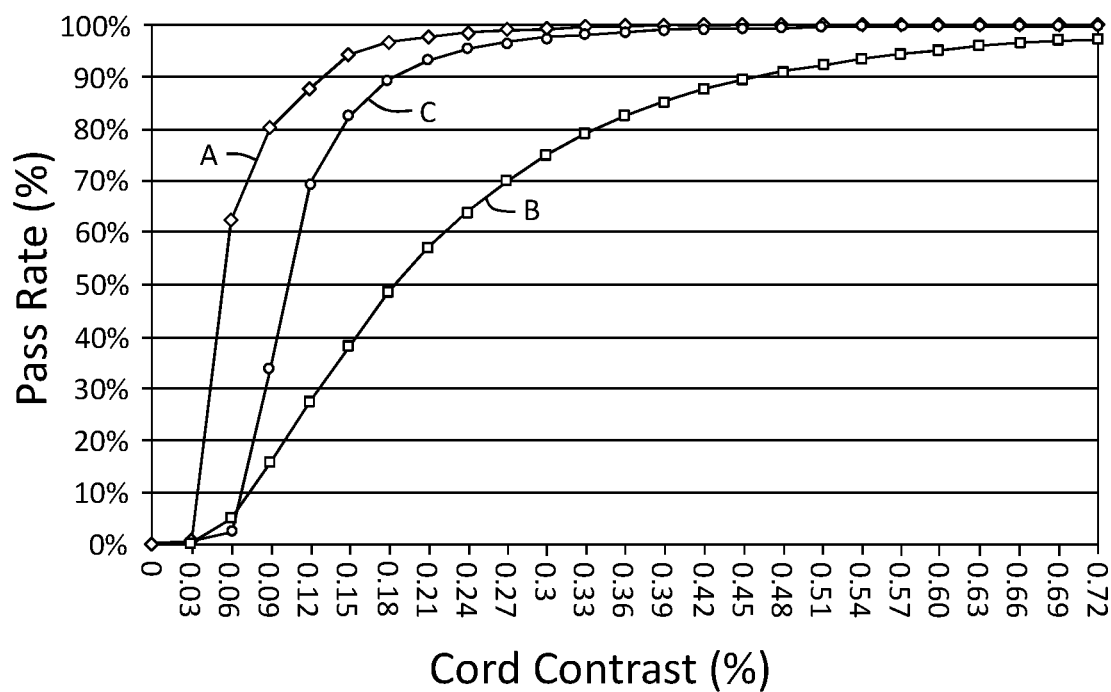
FIG. 9 is a plot of pass rate for cord from three different melting vessel designs A, B and C.

FIG. 9 shows the process output in the form of cord performance (cumulative pass rate in percent). Cord is a measure of the chemical inhomogeneity of the glass as it affects the viscosity in the forming process. Cord is measured using a near-infrared light source, optical fiber and discrete free-space optics to launch a free-space collimated beam. The collimated beam is transmitted through the finished product, e.g., flat glass substrate, and into a detector assembly on the opposite side, where the transmitted light is focused by a lens and captured by a sensing element with an oriented slit aperture. A coherence length of the collimated beam is less than the substrate thickness, with a uniform phase front across the beam width. As the beam passes through a substrate with cord, the beam phase is weakly modulated by the thickness variations. The optical effect is similar to that of a diffraction grating, and to the production of the zero-order and the two first-order diffracted fields. These diffracted fields interfere as they continue to propagate to give intensity maxima and minima as a function of distance from the substrate. A focusing lens is used to enhance the contrast and to shorten the optical path length to the sensing element, and the slit aperture is used to achieve an appropriate amount of spatial resolution and insensitivity to vibration. The cord measurement is made by moving the sensor element in an across-the-substrate direction, all while recording the amount of power received by the detector. Digital filtering of the detector signal profiles may be performed to extract out cord contrast as a percent.

As FIG. 9 shows, the cord contrast % in the range from 0 to 0.7% shows significant process to process differences between designs A, B and C. The capability of design A is clearly better for cord than that of designs B and C, as shown by a high cumulative pass rate. To wit, nearly 100% of the output over a year's production is equal to or less than about 0.33% contrast. Design C shows degraded performance. Design B is clearly worse than designs A and C using this metric of stability: Only about 80% yield from the design C melting vessel fell within 0.33% cord contrast.

Figure 10A:
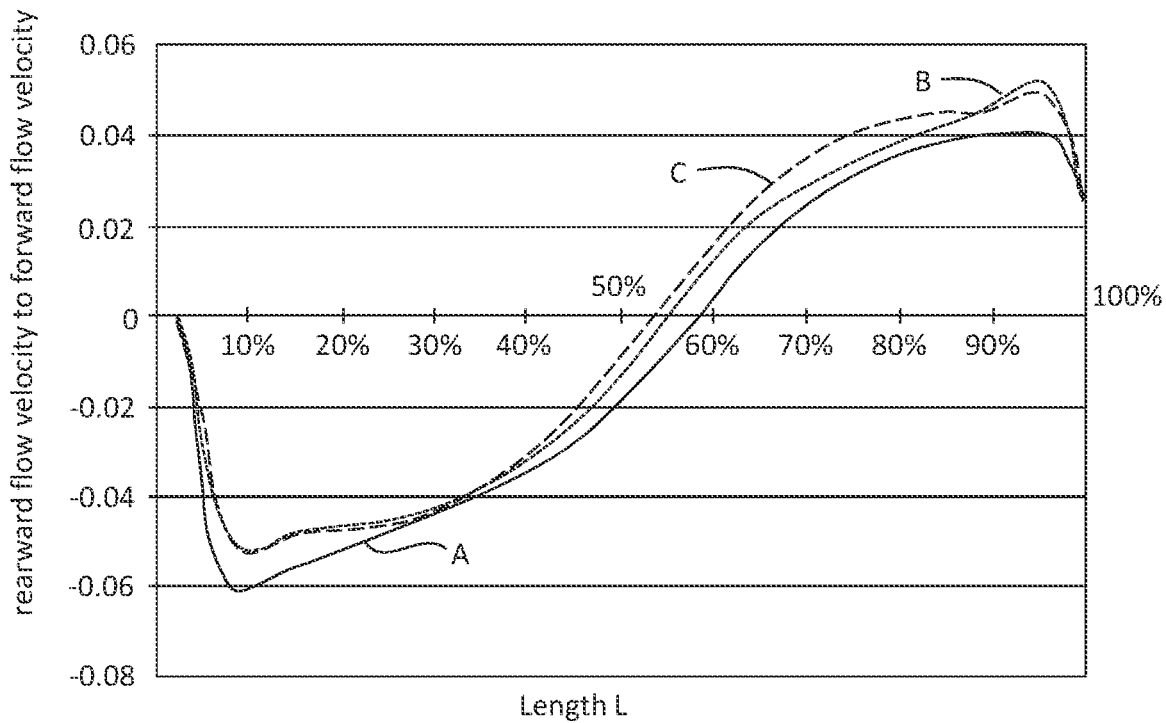
FIG. 10A is a graph plotting modeled rearward flow velocity vs. forward flow velocity as a function of length L for three melting vessel designs A, B and C.

FIG. 10A is a graph of modeled rearward convective flow velocity vs. forward convective flow velocity along the centerline of the melting vessel (where the transverse flow is assumed zero) and at a position 2 inches (5.1 centimeters) below the surface of the molten glass as a function of a percentage of length L of the melting vessel, for the three melting vessel designs A, B and C described above. While the individual curves of FIG. 10A represent specific values along the length of the melting vessel (where 0% is a position at the back wall of the melting vessel and 100% is a position at the front wall of the melting vessel), a parameter of interest is the overall integrated longitudinal flow velocity ratio determined as the absolute value of the ratio of the area "under the curve" (i.e., between the curve and the horizontal axis) for the rearward flow velocity and the area under the curve for the forward flow velocity. Maintaining the integrated longitudinal flow velocity ratio equal to or greater than 1.5, for example in a range from about 1.5 to about 2.0, from about 1.6 to about 2.0, or from about 1.7 to about 2.0 ensures flow short circuiting (flow bypassing the central hot spot) is minimized and limits process upsets originating from unmixed glass that can manifest as blister (bubbles) and cord events. In the graph of FIG. 10A, the demarcation between the rearward flow and the forward flow is the point at which the curve crosses the horizontal axis, e.g., between about 50% and 60% of the length of the melting vessel in the designs studied (the fact that the zero crossing for all three curves is greater than 50% indicates that the hotspot for all three melting vessels is slightly forward of the center of the melting vessel). In accordance with the graph of FIG. 10A, the rearward flow is that portion of the curve to the left of the zero crossing (e.g., negative values) and the forward flow is that portion of the curve to the right of the zero crossing (positive values). Thus, the area of the curve representing the integrated rearward flow is that area between the horizontal axis and the positive portion of the curve (from the back wall to the hot spot), and the area of the curve representing the integrated forward flow is that area between the horizontal axis and the negative portion of the curve (between the hot spot and the front wall). The ratio of these areas is the integrated longitudinal flow velocity.

As in the instances above, the aspect ratio of melting vessel design A with bottom mounted molybdenum electrodes was 2.4, the aspect ratio of melting vessel design B with bottom mounted molybdenum electrodes was 1.9, and the aspect ratio of melting vessel design C with side wall-mounted tin oxide electrodes was 2.4. All three melting vessels utilized two feed ports positioned in back wall 100 and symmetric about the centerline, both feed ports feeding identical raw material into basin 100 at substantially the same rate. The convective flows were determined and evaluated using the Rayleigh number Ra (equation 1).

Melting vessel design A strengthens the rearward convection (increases the rearward flow velocity) compared to the forward convection, as shown in the Table, row 1, which is the ratio of integrated rearward flow velocity to the integrated forward flow velocity from FIG. 10A. Maintaining the ratio of integrated rearward flow velocity equal to or greater than 1.5 minimizes flow short circuiting and limits process upsets resulting from unmixed glass that can manifest as blister and cord events.

Figure 10B:
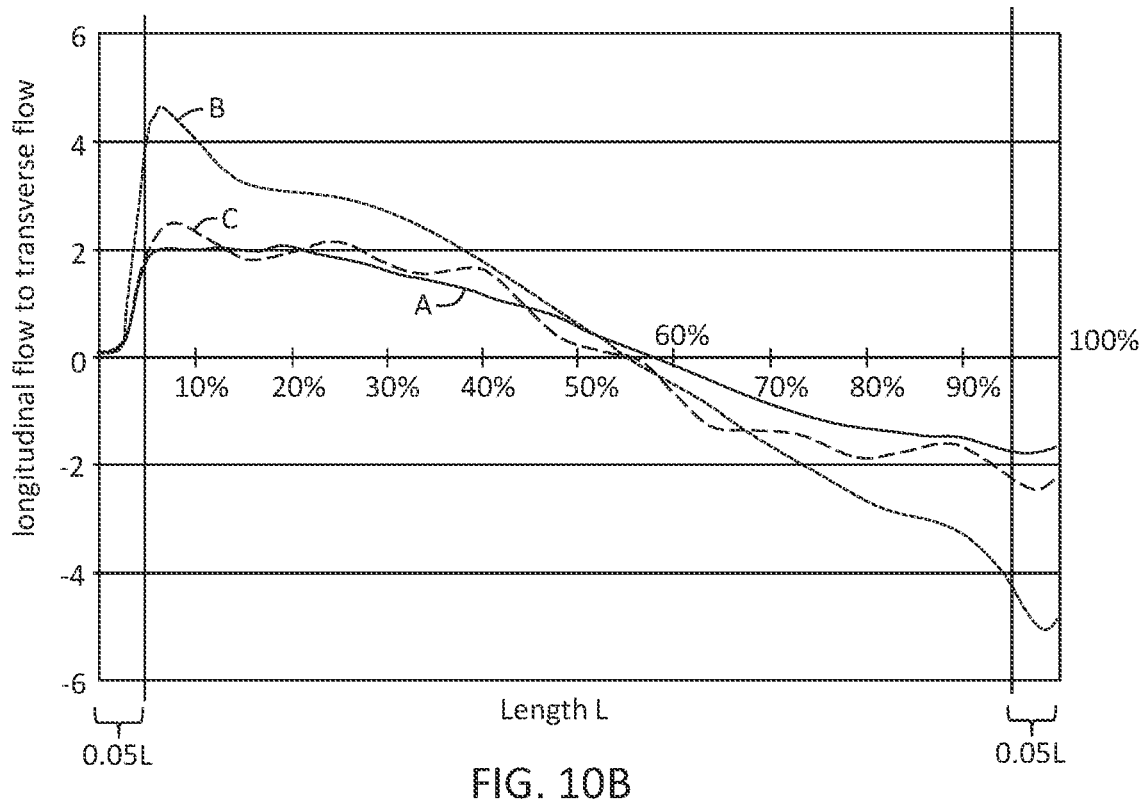
FIG. 10B is a graph plotting modeled longitudinal flow velocity vs. transverse flow velocity as a function of length L for three melting vessel designs A, B and C.

FIG. 10B is a graph of modeled convective flow velocity for longitudinal (lengthwise) convective flow vs. transverse flow velocity at a position 2 inches (5.1 centimeters) below the surface of the molten glass in the melting vessel as a function of a percentage of length L for the three melting vessel designs A, B and C and at a transverse position of a screw feeder. Melting vessel design A further ensures transverse convection at the front of the melting vessel is significantly stronger than forward convection (as indicated in row 2 of the Table, which provides the ratio of transverse flow velocity to longitudinal flow velocity at a position from front wall 102 that is 5% of the length L, i.e., 0.95 L (95%) and at a depth 5.1 cm below the surface of the molten material at the screw feeder location (that is, at a position in the transverse direction that is equal to the transverse position of the screw feeder). It should be noted that two transverse convection flows are present, originating at the hot spot and radiating outward toward the side walls. The transverse flow velocity described above refers to either one of these two flows, since in the modeling both transverse flows were assumed to be equal. Also, as in FIG. 10A, flow to the left of the hot spot (zero crossing on the horizontal axis) is rearward flow and flow to the right of the hot spot is forward flow. If the inverse value of the transverse-to-forward flow velocity ratio, expressed as a percentage, is greater than 50%, for example in a range from greater than 50% to about 60%, such as in a range from about 51% to about 60%, such as in a range from about 52% to about 60%, such as in a range from about 53% to about 60%, such as in a range from about 54% to about 60%, such as in a range from about 55% to about 60%, such as in a range from about 56% to about 60%, for example 59%, then the melting vessel design ensures forward flow and short circuiting flow do not dominate. For example, the absolute value of a point on curve B (representing melting vessel design B) at 95% L (forward longitudinal flow) is approximately 4.27. The inverse of 4.27, expressed as a percent, is (1/4.27) 100=23.4%.

Finally, design A ensures transverse convection in the rear of the melting vessel is also strengthened relative to the rearward longitudinal convection. This is shown by the ratio in row 3 of the Table, which provides the ratio of transverse flow velocity to longitudinal (rearward) flow velocity at a position 0.05 L (5% L) from back wall 100 and at a depth 5.1 cm below the surface of the molten material at a screw feeder location. Maintaining the absolute value of the inverse of the transverse-to-forward flow velocity ratio (expressed as a percentage) greater than 50%, for example in a range from equal to or greater than 50% to about 60%, such as in a range from about 51% to about 60%, such as in a range from about 52% to about 60%, such as in a range from about 53% to about 60%, such as in a range from about 54% to about 60%, such as in a range from about 55% to about 60%, such as in a range from about 56% to about 60%, for example 59% helps push the surface flows of raw material (batch snakes) toward the side walls more effectively and limits direct short circuiting of flow and movement of unmixed materials directly forward toward front wall 102. That is, the batch material contained within the batch snakes is provided more time to dissolve into the melt when the batch snakes travel a route nearer the side walls.

TABLE

|  | A | B | C |
|---|---|---|---|
| Integrated ratio of rearward flow to forward flow | 1.70 | 1.25 | 1.12 |
| Inverse ratio of transverse flow to forward flow at front wall | 59% | 23% | 45% |
| Inverse ratio of transverse flow to rearward flow at back wall | 59% | 24% | 50% |

It will be apparent to those skilled in the art that various modifications and variations can be made to embodiments of the present disclosure without departing from the spirit and scope of the disclosure. Thus it is intended that the present disclosure cover such modifications and variations provided they come within the scope of the appended claims and their equivalents.

What is claimed is:

1. A method for producing a glass article, comprising:
feeding with at least one screw feeder a raw material into a melting vessel containing molten glass, the melting vessel comprising a back wall, a front wall, a first side wall, a second side wall and a bottom wall, the second side wall is parallel to the first side wall, the back wall is parallel to the front wall, and the bottom wall contacts the back wall, the front wall, the first side wall, and the second side wall, the back wall comprising at least one feed port opening through which the raw material is delivered into the melting vessel, the melting vessel comprising a length L extending from an inside surface of the back wall to an inside surface of the front wall, a width W orthogonal to the length L, the width W extending from an inside surface of the first side wall to an inside surface of the second side wall, a longitudinal centerline extending along the length L and equidistant from both the first and second side walls, L/W is in a range from about 2.0 to about 2.4, and L·W is equal to or less than about 17 square meters;
heating the molten glass with an electric current between a plurality of electrodes comprising molybdenum, the plurality of electrodes extending upward into an interior of the melting vessel through the bottom wall, thereby producing a plurality of convection flows in the molten glass comprising a first convection flow at a first flow velocity parallel to the longitudinal centerline in a direction toward the back wall and down the back wall toward the bottom wall, a second convection flow at a second flow velocity parallel to the longitudinal centerline toward the front wall and down the front wall toward the bottom wall, a third convection flow at a third flow velocity in a transverse direction from the longitudinal centerline toward the first side wall and down the first side wall toward the bottom wall, and a fourth convection flow at a fourth flow velocity in a transverse direction from the longitudinal centerline toward the second side wall and down the second side wall toward the bottom wall, and an inverse of an absolute value of a ratio of the third flow velocity or the fourth flow velocity to the second flow velocity at a position that is 0.05 L from the front wall and a depth that is 5.1 cm below a surface of the molten glass at a transverse position of the at least one screw feeder is greater than 50%.

2. The method according to claim 1, L/W is in a range from about 2.2 to about 2.4.

3. The method according to claim 1, L·W is equal to or less than about 14 square meters.

4. The method according to claim 1, further comprising simultaneously with the heating the molten glass with the electric current, heating the molten glass with combustion burners.

5. The method according to claim 4, an energy input to the molten glass by the electric current is from about 20% to about 80% of a total energy input into the molten glass by the electric current and the combustion burners.

6. The method according to claim 5, the combustion burners extending through an upper portion of one or more of the first side wall or the second side wall such that flames from the combustion burner extend over the molten glass.

7. The method according to claim 1, the melting vessel further comprising a top wall extending over the molten glass, the top wall spaced apart from the bottom wall, and wherein an integrated longitudinal flow velocity ratio of the first flow velocity to the second flow velocity along the longitudinal centerline at the depth that is 5.1 cm below a surface of the molten glass is equal to or greater than 1.5.

8. The method according to claim 1, further comprising forming the molten glass into a glass ribbon by flowing the molten glass over converging forming surfaces.

9. The method according to claim 1, an axis that is parallel to a direction of gravitational force intersects the bottom wall and is spaced apart from the front wall, the back wall, the first side wall, and the second side wall.

10. The method according to claim 1, the L/W is in a range from about 2.1 to about 2.4.

11. The method according to claim 1, the at least one screw feeder comprising a screw positioned within a conduit that extends along an axis from a storage bin to the melting vessel, the conduit attached to and in contact with the back wall of the melting vessel such that the axis extends through the at least one feed port opening.

12. A method for producing a glass article, comprising:
feeding with at least one screw feeder a raw material into a melting vessel containing molten glass, the melting vessel comprising a back wall, a front wall, a first side wall, a second side wall and a bottom wall, the second side wall is parallel to the first side wall, the back wall is parallel to the front wall, and the bottom wall contacts the back wall, the front wall, the first side wall, and the second side wall, the back wall comprising at least one feed port opening through which the raw material is delivered into the melting vessel, the melting vessel comprising a length L extending from an inside surface of the back wall to an inside surface of the front wall, a width W orthogonal to the length L, the width W extending from an inside surface of the first side wall to an inside surface of the second side wall, a longitudinal centerline extending along the length L and equidistant from both the first and second side walls, L·W is less than about 17 square meters and L/W is in a range from about 2.0 to about 2.4;
heating the molten glass by applying an electric voltage to a plurality of molybdenum-containing electrodes and establishing an electric current between the plurality of molybdenum-containing electrodes extending upward into an interior of the melting vessel through the bottom wall, such that a variation in voltage-to-ground at each electrode of the plurality of electrodes is within a range from about −80 volts to about +80 volts, thereby producing a plurality of convection flows in the molten glass comprising a first convection flow at a first flow velocity parallel to the longitudinal centerline in a direction toward the back wall and down the back wall toward the bottom wall, a second convection flow at a second flow velocity parallel to the longitudinal centerline toward the front wall and down the front wall toward the bottom wall, a third convection flow at a third flow velocity in a transverse direction from the longitudinal centerline toward the first side wall and down the first side wall toward the bottom wall, and a fourth convection flow at a fourth flow velocity in a transverse direction from the longitudinal centerline toward the second side wall and down the second side wall toward the bottom wall, and wherein an integrated longitudinal flow velocity ratio of the first flow velocity to the second flow velocity along the longitudinal centerline at a depth that is 5.1 cm below a surface of the molten glass is equal to or greater than 1.5.

13. The method according to claim 12, further comprising simultaneously with the heating the molten glass with the electric current, heating the molten glass with combustion burners.

14. The method according to claim 13, an energy input to the molten glass by the electric current is at least 20% of a total energy input into the molten glass by the electric current and the combustion burners.

15. The method according to claim 12, an inverse of an absolute value of a ratio of the third flow velocity or the fourth flow velocity to the second flow velocity at a position that is 0.05 L from the front wall and the depth that is 5.1 cm below a surface of the molten glass at a transverse position of the at least one screw feeder is greater than 50%.

16. The method according to claim 15, an inverse of an absolute value of a ratio of the third flow velocity or the fourth flow velocity to the first flow velocity at a position that is 0.05 L from the back wall and the depth that is 5.1 cm below a surface of the molten glass at a transverse position of the at least one screw feeder is greater than 50%.

17. A method for producing a glass article, comprising:
feeding with at least one screw feeder a raw material into a melting vessel containing molten glass, the melting vessel comprising a back wall, a front wall, a first side wall, a second side wall and a bottom wall, the second side wall is parallel to the first side wall, the back wall is parallel to the front wall, and the bottom wall contacts the back wall, the front wall, the first side wall, and the second side wall, the back wall comprising at least one feed port opening through which the raw material is delivered into the melting vessel, the melting vessel comprising a length L extending from an inside surface of the back wall to an inside surface of the front wall, a width W orthogonal to the length L, the width W extending from an inside surface of the first side wall to an inside surface of the second side wall, a longitudinal centerline extending along the length L and equidistant from both the first and second side walls, L/W is in a range from about 2.0 to about 2.4, and L·W is equal to or less than about 17 square meters;
heating the molten glass with an electric current between a plurality of electrodes comprising molybdenum, the plurality of electrodes extending upward into an interior of the melting vessel through the bottom wall, thereby producing a plurality of convection flows in the molten glass comprising a first convection flow at a first flow velocity parallel to the longitudinal centerline in a direction toward the back wall and down the back wall toward the bottom wall, a second convection flow at a second flow velocity parallel to the longitudinal centerline toward the front wall and down the front wall toward the bottom wall, a third convection flow at a third flow velocity in a transverse direction from the longitudinal centerline toward the first side wall and down the first side wall toward the bottom wall, and a fourth convection flow at a fourth flow velocity in a transverse direction from the longitudinal centerline toward the second side wall and down the second side wall toward the bottom wall, and an inverse of an absolute value of a ratio of the third flow velocity or the fourth flow velocity to the first flow velocity at a position that is 0.05 L from the back wall and a depth that is 5.1 cm below a surface of the molten glass at a transverse position of the at least one screw feeder is greater than 50%.

* * * * *